(12) United States Patent
Humphris

(10) Patent No.: US 11,959,936 B2
(45) Date of Patent: Apr. 16, 2024

(54) SCANNING PROBE SYSTEM

(71) Applicant: INFINITESIMA LIMITED, Abingdon (GB)

(72) Inventor: Andrew Humphris, Abingdon (GB)

(73) Assignee: INFINITESIMA LIMITED, Abingdon (GB)

( * ) Notice: Subject to any disclaimer, the term of this patent is extended or adjusted under 35 U.S.C. 154(b) by 64 days.

(21) Appl. No.: 17/776,496

(22) PCT Filed: Nov. 30, 2020

(86) PCT No.: PCT/GB2020/053067
§ 371 (c)(1),
(2) Date: May 12, 2022

(87) PCT Pub. No.: WO2021/111114
PCT Pub. Date: Jun. 10, 2021

(65) Prior Publication Data
US 2022/0390484 A1 Dec. 8, 2022

(30) Foreign Application Priority Data

Dec. 2, 2019 (GB) ..................................... 1917596

(51) Int. Cl.
*G01Q 10/06* (2010.01)
(52) U.S. Cl.
CPC .................. *G01Q 10/065* (2013.01)
(58) Field of Classification Search
CPC .................................................. G01Q 10/065
USPC ............................................................ 850/4
See application file for complete search history.

(56) References Cited

U.S. PATENT DOCUMENTS 8,011,230 B2 9/2011 Watanabe et al.
2017/0343580 A1* 11/2017 Nagata ................... G01Q 60/18

FOREIGN PATENT DOCUMENTS

| EP | 2940480 A1 | 11/2015 |
| JP | H08136552 A | 5/1996 |
| WO | WO-2012/104625 A1 | 8/2012 |

OTHER PUBLICATIONS

Search Report issued in Great Britain Patent Application No. 1917596.7 dated May 28, 2020.
(Continued)

*Primary Examiner* — Nicole M Ippolito
(74) *Attorney, Agent, or Firm* — MARSHALL, GERSTEIN & BORUN LLP

(57) ABSTRACT

A method of scanning a sample with a scanning probe system, the scanning probe system comprising a probe comprising a cantilever extending from a base to a free end, and a probe tip carried by the free end of the cantilever, the method comprising using the probe to measure an electrostatic interaction between the sample and the probe; and after measuring the electrostatic interaction between the sample and the probe, scanning the sample with the probe while simultaneously applying a bias voltage to the scanning probe system, the applied bias voltage based on the measured electrostatic interaction between the sample and the probe.

20 Claims, 9 Drawing Sheets

(56) References Cited

OTHER PUBLICATIONS

Vernisse, L. et al., "Interaction between perylene-derivated molecules observed by low temperature scanning tunneling microscopy," *Surface Science* [*online*], vol. 669 (2017).
International Search Report and Written Opinion issued in PCT Patent Application No. PCT/GB2020/053067 dated Mar. 3, 2021.
Vernisse, L. et al., "Interaction between perylene-derivated molecules observed by low temperature scanning tunneling microscopy," *Surface Science*, vol. 669, pp. 87-94 (2018).

\* cited by examiner

SCANNING PROBE SYSTEM

FIELD OF THE INVENTION

The present invention relates to a scanning probe system and a method of scanning a sample with a scanning probe system.

BACKGROUND OF THE INVENTION

Some samples to be scanned by a scanning probe microscope develop an electrical charge. This charge can have serious impacts on the measurements made by the scanning probe microscope—in more minor cases, the resulting image is distorted and inaccurate due to interactions between the scanning probe and the charge on the sample. In more major cases, the scanning probe is unable to even approach the sample to within a suitable scanning range due to the interactions.

U.S. Pat. No. 8,011,230 discloses a scanning probe microscope, capable of performing shape measurement not affected by electrostatic charge distribution of a sample. An electrostatic charge state is monitored by detecting a change in a flexure or vibrating state of a cantilever due to electrostatic charges, in synchronization with scanning during measurement with relative scanning between the probe and the sample. The microscope makes a potential adjustment so as to cancel an influence of electrostatic charge distribution, thus preventing damage of the probe or the sample due to discharge and achieving reduction in measurement errors due to electrostatic charge distribution.

A problem with the microscope of U.S. Pat. No. 8,011,230 is that since it monitors the electrostatic charge state in synchronization with scanning, this monitoring can slow down the scanning rate.

SUMMARY OF THE INVENTION

A first aspect of the invention provides a method of scanning a sample with a scanning probe system. The scanning probe system comprises a probe comprising a cantilever extending from a base to a free end, and a probe tip carried by the free end of the cantilever. The method comprises: moving the probe to a measurement position at which the sample imposes an electrostatic force on the probe; at the measurement position: applying a measurement voltage to the scanning probe system, varying the measurement voltage applied to the scanning probe system, and monitoring a reaction of the probe to the variation of the measurement voltage to measure a counteracting voltage value which reduces or nullifies the electrostatic force on the probe at the measurement position; and after the counteracting voltage value has been measured, scanning the sample with the probe while applying a bias voltage to the scanning probe system, wherein the bias voltage is based on the counteracting voltage value.

A further aspect of the invention provides a scanning probe system comprising: a probe comprising a cantilever extending from a base to a free end, and a probe tip carried by the free end of the cantilever; wherein the scanning probe system is arranged to perform the method of the first aspect of the invention.

The bias voltage reduces the electrostatic force between the sample and the probe as the sample is scanned by the probe—ideally nullifying it (i.e. reducing the electrostatic force to zero).

Unlike in U.S. Pat. No. 8,011,230, which monitors an electrostatic charge state in synchronization with scanning, the present invention scans the sample after a counteracting voltage value has been measured. This means that the sample can be scanned more quickly on the basis of a predetermined bias voltage (or a set of predetermined bias voltages). Typically the bias voltage does not vary during the scanning of the area of the sample, although in some embodiments it may vary—for instance varying between a set of predetermined bias voltages.

Only a single counteracting voltage value may be measured. Alternatively, multiple counteracting voltage values may be measured before the sample is scanned.

Optionally the method comprises: moving the probe to a plurality of measurement positions at which the sample imposes an electrostatic force on the probe; and at each measurement position: applying a measurement voltage to the scanning probe system, varying the measurement voltage applied to the scanning probe system, and monitoring a reaction of the probe to the variation of the measurement voltage to measure a respective counteracting voltage value which reduces or nullifies the electrostatic force on the probe at the measurement position; and determining the bias voltage on the basis of at least two of the counteracting voltage values.

The bias voltage may be determined without reference to the location of an area of the sample to be scanned (for instance it may be calculated as an average of the counteracting voltage values). More typically an area of the sample is scanned with the probe, and the bias voltage is determined on the basis of a location of the area of the sample (for instance its distance from a centre of the sample, or its X, Y coordinates). This enables the bias voltage to more accurately counteract the electrostatic force on the probe if the charge state of the sample varies across its surface.

In some embodiments a first bias voltage is determined on the basis of a location of a first area of the sample, the first bias voltage is applied to the scanning probe system during scanning of the first area of the sample; a second bias voltage is determined on the basis of a location of a second area of the sample, and the second bias voltage is applied to the scanning probe system during scanning of the second area of the sample. Typically the first and second areas are not contiguous with each other.

Optionally the (or each) bias voltage is determined from the counteracting voltage values by interpolation, for instance linear interpolation.

Optionally the counteracting voltage value is determined at the (or each) measurement position with the probe tip spaced from the sample by a distance greater than 1 μm.

Optionally the method further comprises storing the (or each) counteracting voltage value before the sample is scanned.

Optionally an area of the sample is scanned with the probe, and the bias voltage applied to the scanning probe system does not vary during the scanning of the area of the sample. Alternatively, the bias voltage applied to the scanning probe system may vary during the scanning of the area of the sample.

Optionally scanning the sample with the probe comprises taking a series of scanning measurements of the sample at a series of scanning positions across the sample; and each scanning measurement is taken by moving the probe tip towards the sample, taking a scanning measurement at a respective one of the scanning positions, then retracting the probe tip away from the sample. Each scanning measurement may be used as a pixel of a two-dimensional image, for example. The bias voltage applied to the scanning probe system may not vary from scanning position to scanning position.

Optionally for each scanning measurement the bias voltage applied to the scanning probe system remains substantially constant as the probe tip moves towards the sample, and as the probe tip retracts away from the sample.

Scanning the sample with the probe may comprise imaging the sample with the probe so as to generate an image having a plurality of pixels. Typically the bias voltage applied to the scanning probe system is the same for each pixel of the image.

Scanning the sample with the probe may comprise measuring a topography of the sample, or some other property of the sample.

Scanning the sample with the probe may comprise generating a lateral or horizontal scanning motion between the sample and the probe. The scanning motion may be generated by moving the probe and/or by moving the sample. The scanning motion may follow a raster pattern for example.

The bias voltage may have a magnitude and a sign based on the counteracting voltage value(s).

Optionally the variation of the measurement voltage causes the probe to deflect, and the deflection of the probe is monitored to determine the counteracting voltage. The monitored deflection may be an angle of the cantilever relative to a fixed axis.

Alternatively the variation of the measurement voltage may cause an oscillation parameter of the probe to change (for instance a phase, frequency or amplitude of an oscillation of the probe) and the oscillation parameter is monitored to determine the counteracting voltage.

The measurement voltage and the bias voltage may be applied to the probe, and most preferably they are applied to the cantilever.

Alternatively the measurement voltage and the bias voltage may be applied to a conductor proximate to the sample. The conductor proximate to the sample may be a conductive plate, for example. The conductive plate may be provided on the sample. The conductive plate may be provided on an opposite side of the sample to the probe. The conductor may be a stage which carries the sample.

Applying a bias voltage to the scanning probe system may additionally or alternatively comprise applying a bias voltage directly to the sample.

Optionally the cantilever comprises an electrically conductive layer separated from the probe tip by an electrically insulating barrier, and the bias voltage is applied to the electrically conductive layer. The probe may be arranged or constructed so that there is no electrically conductive pathway from the electrically conductive layer to the probe tip. The electrically insulating barrier may be a body of the cantilever.

As the sample is scanned with the probe, the electrically conductive layer may be illuminated to impart a cyclic bending motion to the probe.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
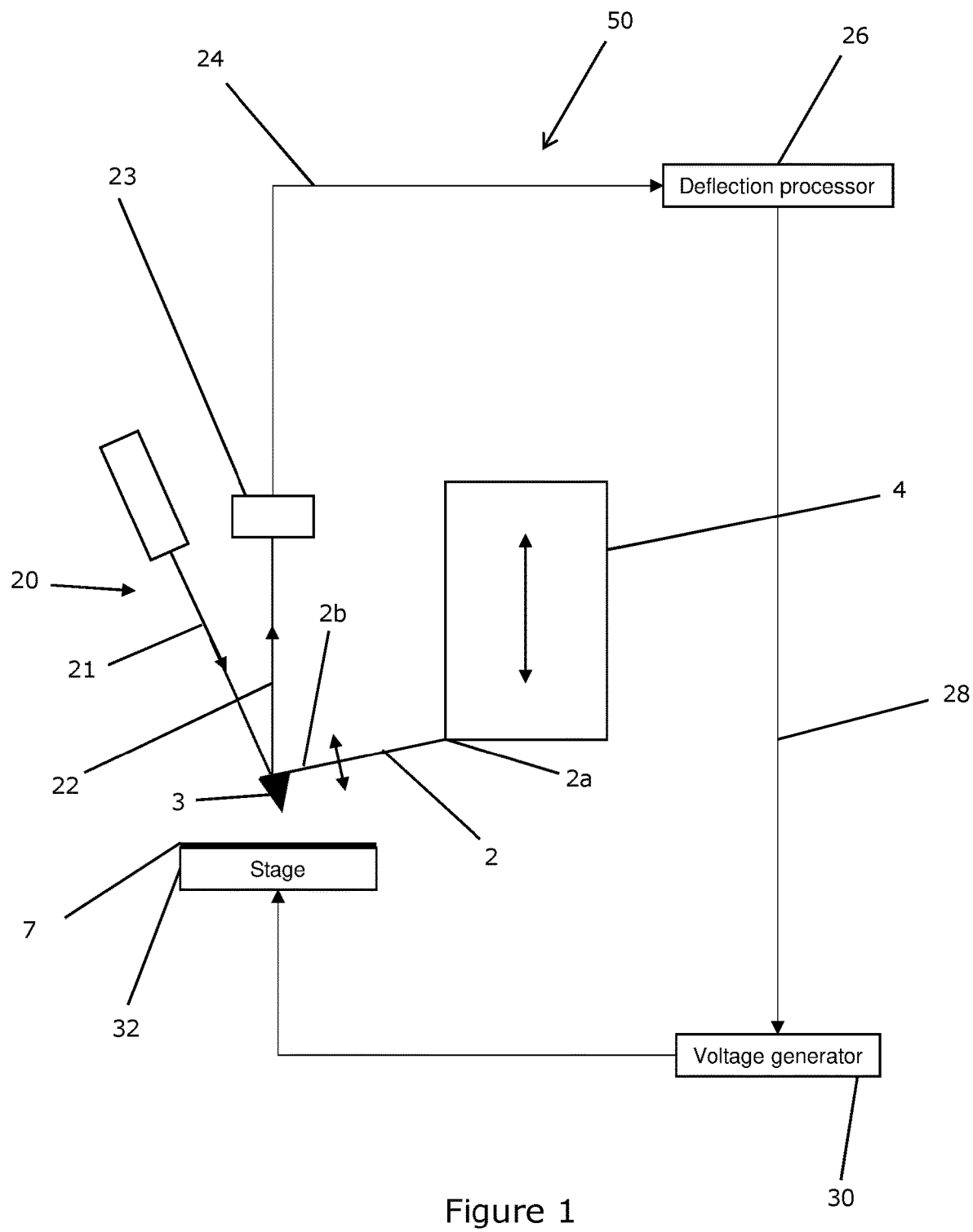
FIG. 1 shows certain elements of a scanning probe system according to one embodiment of the invention.

A scanning probe system 50 (for instance a scanning probe microscope) according to a first embodiment of the invention is shown in FIG. 1. Certain scanning and imaging elements of the system 50 are omitted in FIG. 1 for purposes of clarity, but shown in FIG. 5. Similarly, certain elements of the system 50 are omitted in FIG. 5 for purposes of clarity, but shown in FIG. 1.

The system 50 comprises a driver 4 and a probe comprising a cantilever 2 and a probe tip 3. The bottom of the driver 4 provides a support for the probe, with the cantilever 2 extending from the driver 4 from a base 2a to a free end 2b. The probe tip 3 is carried by the free end 2b of the cantilever 2.

The probe tip 3 comprises a three dimensional, often conical or pyramidal structure. The tip tapers to a point that is its closest point of interaction with a surface under interrogation. The cantilever 2 is the beam itself, excluding the probe tip 3, which supports the probe tip 3 at its free end 2b and at its base 2a is held by the driver 4. Note that the cantilever 2 and tip 3 are not shown to scale in FIG. 1 or any of the other drawings.

The probe is generally fabricated from an insulator such as silicon, silicon oxide or silicon nitride. Typically, the cantilever 2 is around 50-200 µm long, 20-50 µm wide and around 0.2-2 µm thick, but this size can of course be varied according to application. The shape may also be varied: typically it is rectangular or triangular with, in the latter case, the tip in the vicinity of its apex. The tip 3 is typically made from carbon, and is typically 5 µm at its base, 3-10 µm high and with an end radius of curvature of 2-20 nm. In use, the fine point at the end of the tip is oriented towards a sample 7. Alternatively the probe may have a cantilever around 5-20 µm long and 3-10 µm wide, with a correspondingly smaller tip.

The driver 4 may be a piezoelectric actuator which expands and contracts up and down in the Z-direction in accordance with a drive signal. Typically the driver 4 is mechanically guided by flexures (not shown).

A detector 20 which detects an angle of the probe, and therefore its deflection, by means of an optical lever is provided. The detector 20 comprises a laser which directs a sensing beam 21 onto the cantilever 2, and a reflected beam 22 falls onto a segmented photodiode 23 which is split into a number of segments (typically four). If the angle of the cantilever 2 changes, then the position of the reflected beam 22 on the photodiode 23 also changes. So the relative outputs of the segments of the segmented photodiode 23 gives an indication of the angle of the cantilever 2 relative to the sensing beam 21. This is output as an angle signal on an output line 24. The detector 20 may equivalently use an interferometer to determine the height of the probe tip 3.

The angle signal is received at a deflection processor 26, which analyses the angle signal output from the photodiode 23 and determines a counteracting voltage value (i.e. a potential difference which nullifies the electrostatic force on the probe) to be applied to the scanning probe system based on the deflection angle of the cantilever 2. A signal indicative of the counteracting voltage value to be applied is transmitted along output line 28 and received by a voltage generator 30. Based on the signal indicative of the counteracting voltage value, the voltage generator 30 determines the bias voltage and applies the bias voltage to the scanning probe system. In the illustrated embodiment, the bias voltage is applied to a stage 32 carrying the sample 7.

Figure 5:
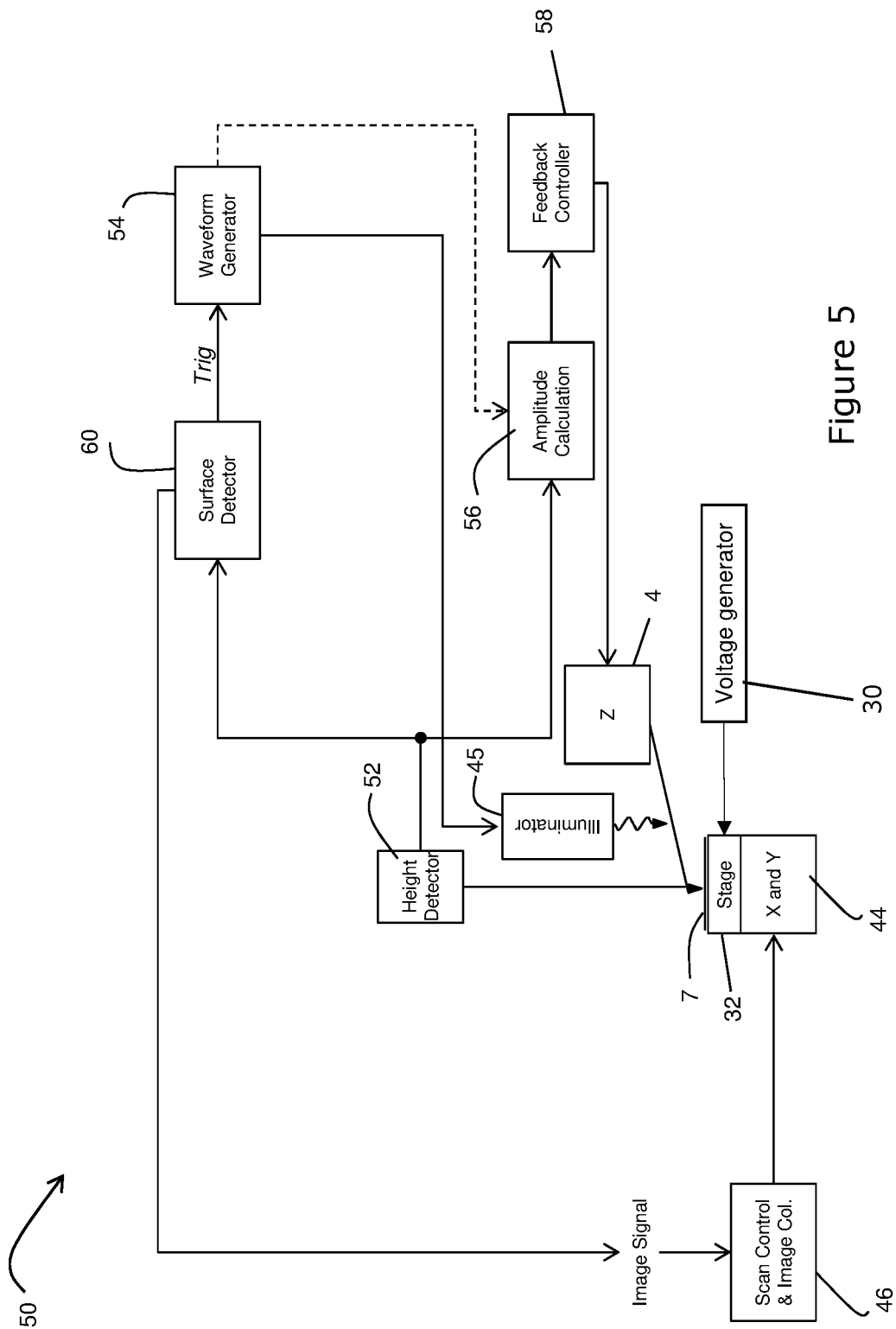
FIG. 5 shows scanning and imaging elements of the system of FIG. 1.

After the counteracting voltage value has been determined as described above, the sample is scanned with the probe while simultaneously applying the bias voltage to the scanning probe system. FIG. 5 shows various elements of the system 50 which are required to scan the sample and acquire an image. A full description of the scanning and imaging elements of the system 50 can be found in WO 2012/104625, the contents of which are incorporated herein by reference.

Figure 4:
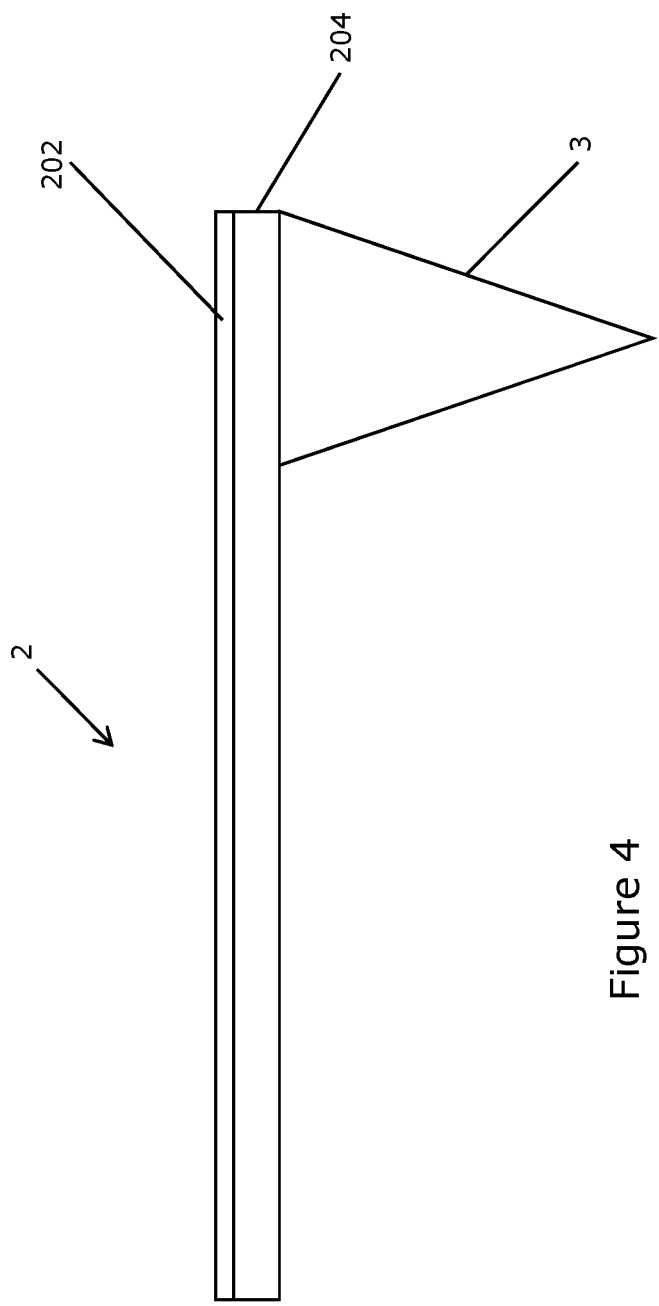
FIG. 4 shows the probe in detail.

During a scanning process the cantilever 2 is driven by a laser illuminator 45 which illuminates the cantilever with an actuation beam, the actuation beam heating the cantilever 2 and causing it to bend down along its length so that the probe tip 3 moves down relative to the base 2a of the cantilever. In this case, preferably the cantilever 2 is a silicon nitride beam 204 with a gold coating 202 on its upper surface, as shown in FIG. 4. This gold coating thermally expands more than the silicon nitride material when heated by the actuation beam. Thus any modification of the intensity of the actuation beam causes the cantilever 2 to heat up or cool down and thereby bend down or un-bend up relative to the driver 4.

The cantilever 2 bends down towards the sample when the actuation beam is turned on, and un-bends up away from the sample when the actuation beam is turned off and the cantilever adopts a more relaxed state. However it will be appreciated that the opposite arrangement may be deployed—that is, that the cantilever may bend up away from the sample when the actuation beam is turned on, and un-bend down towards the sample when the actuation beam is turned off. This may be achieved by placing the gold coating 202 on the lower surface of the cantilever rather than its upper surface.

The illuminator 45 is arranged to move the cantilever 2 in accordance with a second drive signal at the second driver input. The second drive signal is generated by a waveform generator 54.

Scanning motion between the sample and the probe may be generated by a piezoelectric XY-actuator 44 which moves the stage 32. So the relative lateral or horizontal scanning motion between the probe and the sample in the XY plane is generated by motion of the sample 7 rather than by motion of the probe. In another embodiment, the relative scanning motion in the XY plane may be generated instead by motion of the probe (the sample remaining stationary).

Probe cyclic bending motion during scanning of the sample is generated by the waveform generator 54 which controls the illuminator 45. Probe cyclic motion is set at a frequency that is lower than the resonant frequency of the cantilever. It may be periodic or aperiodic, provided that it repeatedly brings the tip towards and then away from the sample surface. In other words, the cycles of the back and forth motion of the tip may be spaced apart in time by a constant time period, or they may be spaced apart by a time period which is not constant—for instance in order to sample different points spaced apart at irregular intervals across the surface of the sample rather than sampling a regularly spaced grid of pixels.

During the course of a measurement, the probe is cycled by the illuminator 45 and moved towards the sample surface until the surface is detected, at which point the probe is retracted and the height recorded at the point of surface detection. An image of the surface height is then created by repeating this process while moving the probe under control of the x, y drivers 44, generally following a raster pattern although any x, y sequence could be followed.

The driver 4 controls the height of the base of the probe above the surface and is operated to maintain the probe cyclic amplitude at a set average level, where the "probe cyclic amplitude" is the height difference for each cycle between the fully retracted position and the point of surface detection. Furthermore the driver 4 has a range well in excess of the probe cyclic motion, thus allowing sample tilt and gross features to be accommodated.

The height of the probe is measured by an interferometric height detector 52. The signal obtained from the height detector 52 is subject to two analytical calculations. A field programmable gate array (FPGA) is configured in order to provide the necessary processing capability. As is known in the art, alternative signal processing techniques such as digital signal processing (DSP) or a dedicated analogue or digital electronic method may be used.

The probe cyclic motion typically has a frequency range of 10 s to 100 s of kHz and sampling frequency for data recording is in the region of 100 MHz. Consequently, each cycle of probe movement is sampled in the region of 1000 to 10,000 times, which is more than sufficient to analyse the height detector signal to obtain the information required. The two analytical calculations may be carried out within a single FPGA but, for clarity, are illustrated in FIG. 5 as being performed by separate processing units.

A probe cyclic amplitude processing unit 156 is used to extract data for use in the z position adjustment system of the microscope. The amplitude of the probe cycles in the height signal can be extracted and used as the parameter on which to determine the z adjustments. The output from the amplitude processing unit 156 is input to a feedback controller 58, which instructs adjustment of the driver 4, which in turn moves the base of the probe, to return the amplitude of probe cycle to its set point.

A surface detection unit 60 performs the second analytical calculation, which provides an indication of the point in the cycle at which the probe tip interacts with the sample surface. The probe velocity, or equivalently rate of change of the height signal, will fall as the tip encounters and begins to interact with the surface. An indication of the surface position is therefore extracted from the point within each cycle at which its rate of change falls below a threshold level for a set period of time.

The output of the surface detection unit 60 is the height of the probe at which it interacts with the surface within each period of a probe cycle. That is, it provides a measure of surface height at the probe's x, y position that can be used to construct an image. Each data point, representing a measured surface height, is output to the scan controller/image processor 46. This measurement is mapped to the scan x, y position within the image processor 46 and so forms a point or pixel on the image.

Once the point of surface detection is determined, the surface detection unit 60 sends a trigger signal to the waveform generator 54. In response, the waveform generator 54 modifies the signal sent to the illuminator 45 in order to retract the tip away from the sample.

Figure 2A:
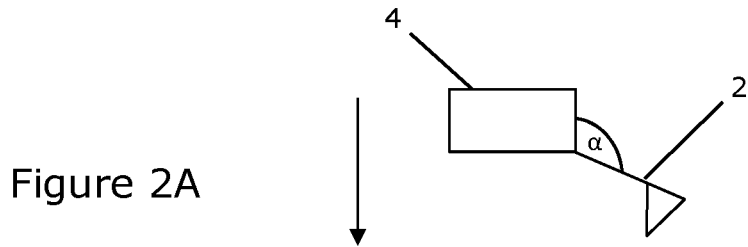
FIGS. 2A-C show a pre-scanning operation of the scanning probe system according to the embodiment of FIG. 1.

A method of determining a counteracting voltage value according to one embodiment of the invention will now be described with reference to FIGS. 2A to 2C. FIG. 2A shows a first time, at which the probe begins at a relatively large distance from the sample 7, but is moved towards the sample 7 by the driver 4. At the relatively large distance, the cantilever 2 has a first angle or deflection value α.

The upper surface of the sample 7 carries an electric charge. In this embodiment, the charge is a positive charge. The stage 32 is made of a conductive material (such as aluminium) and is connected to a voltage generator 30 by a wire 34 such that a voltage can be applied to the stage 32 by the wire 34. At this first time no voltage is being applied to the stage 32.

Figure 2B:
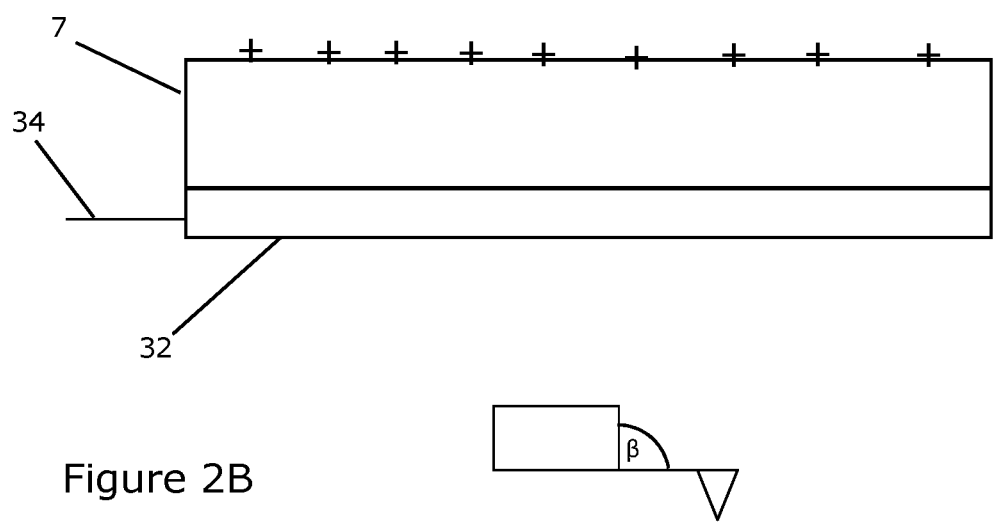
Figure 2C:
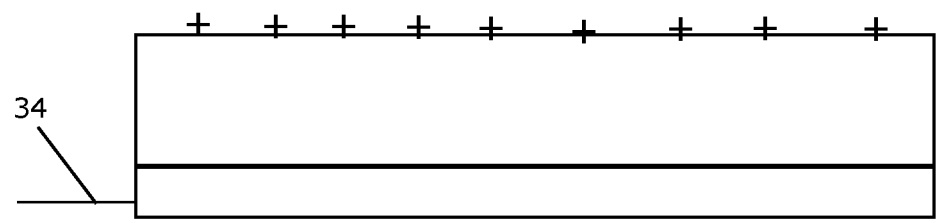

FIG. 2B shows a later time when the probe has been moved closer to the sample 7, to a measurement position at which the sample imposes an electrostatic force on the probe. Specifically, the positively charged sample induces a negative mirror charge on the probe tip, and the potential difference between the probe tip and the sample causes an attractive electrostatic force. This attractive electrostatic force causes the cantilever 2 to bend down to a second angle or deflection value β.

Electrostatic interaction take place on a relatively large length scale. In the measurement position of FIG. 2B, at which the sample imposes an electrostatic force on the probe, the probe and the sample 7 are separated by a distance on the order of 1-10 μm.

With the probe at the measurement position of FIG. 2B, a measurement voltage is applied to the stage 32 by the voltage generator 30. This measurement voltage is initially low, then ramps up—for instance to +1V. As the measurement voltage ramps up, the deflection processor 26 monitors the reaction of the probe to the increasing the measurement voltage. Since the sample is positively charged, and the measurement voltage is also positive (+1V), the increased potential difference between the probe tip and the sample will cause the probe to bend down even further. In other words, a positive measurement voltage will cause the electrostatic forces on the probe to increase rather than decrease.

Once it has been determined that this is the case, the measurement voltage is returned to zero then ramped down to, say, −1V. Such a negative applied voltage will reduce the electrostatic force on the probe at the measurement position so the probe will start to bend back up. As the measurement voltage continues to ramp down, the deflection processor 26 monitors the reaction of the probe until the probe has bent back up to its first angle or deflection value α. At this point the measurement voltage is completely counteracting or nullifying the electrostatic forces imposed on the probe by the sample. The measurement voltage at this time is recorded in a memory as a counteracting voltage value. Note that this counteracting voltage value has not only a magnitude (for instance 30V) but also a sign (in this case, negative).

This process may be carried out by a feedback loop which varies the measurement voltage to return to a set-point based on the first angle or deflection value α.

If the measurement voltage is initially ramped down (rather than up) then in this example it will not be necessary to change its sign during the measurement process. In other words, since the polarity of the charge on the sample is not known, there is a 50% chance of initially ramping the measurement voltage in the correct direction.

In this case a negative voltage is applied to the stage 32, but if a negative charge was present on the sample, a positive voltage would be applied to the stage 32.

The sample is then scanned with the probe while simultaneously applying the bias voltage to the scanning probe system. The voltage applied to the stage 32 is maintained while the sample is scanned with the probe. In order to scan the sample 7 with the probe, the probe must be brought into close proximity with the sample 7—this may involve moving the probe to within nm of the sample, rather than μm. At these short distances the bias voltage may not completely nullify the electrostatic forces originating from the sample, but it will still at least partially oppose them.

In one embodiment, only a single voltage measurement is made, and the magnitude and sign of the bias voltage is constant for the full duration of the sample scan. In the case where a sample is imaged to generate an image having a plurality of pixels, the applied bias voltage may be the same for each pixel.

In another embodiment, multiple voltage measurements may be made, each at a different point on the sample. For instance one counteracting voltage value measurement may be made at the centre of the sample, and another near the edge of the sample. The applied bias voltage during scanning of the sample can then be selected accordingly. For instance if the counteracting voltage value is measured as high at the centre of the sample, and low near the edge of the sample, then the applied bias voltage may vary accordingly depending on the area of the sample being scanned.

Figure 3:
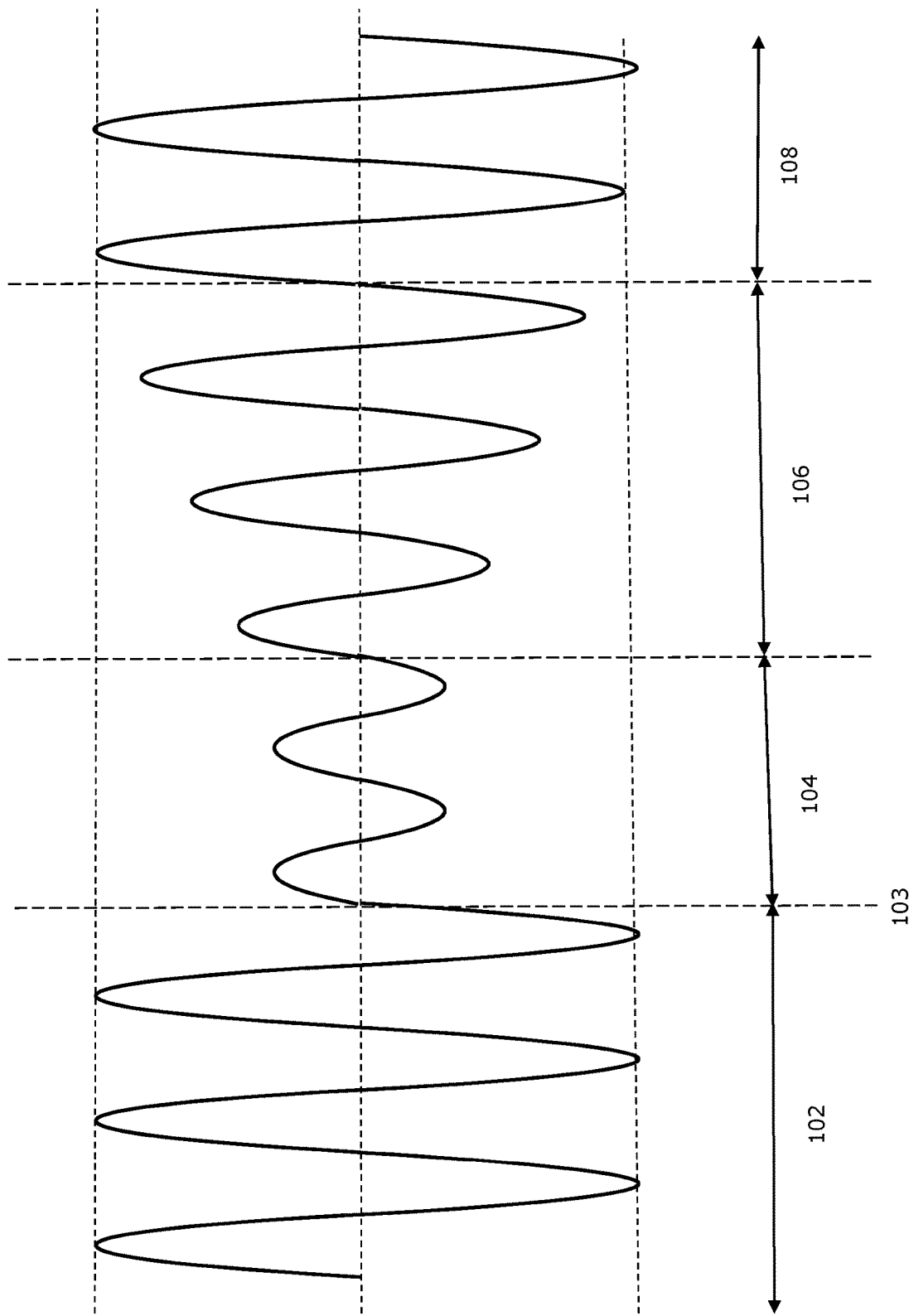
FIG. 3 shows the change in oscillation amplitude with time for a scanning probe system according to a further embodiment of the invention.

FIG. 3 illustrates an alternative method of using the probe to measure the counteracting voltage value. In the embodiment of FIGS. 1 and 2, the probe is not oscillating, and a probe deflection angle is measured. In this embodiment, the probe is oscillating, and the probe's amplitude of oscillation is measured. FIG. 3 illustrates how the probe's amplitude of oscillation changes with time.

During a first time period 102, the probe oscillates with a first amplitude. As with the embodiment of FIG. 2, the probe is initially located a relatively large distance from a sample, the sample carrying a charge.

At a time indicated by 103, the probe is moved towards the sample to a measurement position, and its amplitude of oscillation reduces due to the electrostatic interactions between the probe and the charged sample. The probe oscillates throughout the time period 104 with this lower amplitude.

In this embodiment, the oscillation of the probe will be detected by an interferometer or a segmented photodiode, which outputs the oscillation signal to an amplitude processor, which analyses the oscillation signal and determines an amplitude of oscillation as well as the change in amplitude of oscillation over time. After receiving a signal indicative of a change in oscillation amplitude that needs correcting (i.e. due to charges on the sample imposing an electrostatic force on the probe), the amplitude processor sends a signal to the voltage generator 30 to increase the bias voltage applied to the scanning probe system. As can be seen from time period 106, the bias voltage applied to the scanning probe system is increased until the amplitude of oscillation is returned to its initial value. The amplitude processor works with the voltage generator in a feedback loop, monitoring the amplitude of oscillation of the probe to determine when the amplitude has returned to its initial value.

The probe scans the sample while the bias voltage is simultaneously applied to the scanning probe system, the magnitude and sign of the bias voltage being based on the measured counteracting voltage value which caused the amplitude to return to its initial value.

In this case the amplitude of the oscillation is monitored to determine the counteracting voltage value, but in other examples the frequency or phase of oscillation of the probe may be monitored instead.

In the embodiment described above, the bias voltage is applied to a stage 32 of the scanning probe system that carries the sample, but the bias voltage may alternatively or additionally be applied to any other part of the scanning probe system. As shown in FIG. 4, the probe comprises a gold layer 202 coating an upper surface of the cantilever beam 204. The bias voltage applied to the scanning probe system may therefore be applied to this gold layer 202 instead. In this case, the bias voltage applied to the probe will be of the same polarity as that of the sample (i.e. if the sample has a positive voltage, the probe will be raised to a positive voltage also, and vice versa). This is in contrast to the previously described embodiment, in which the stage 32 is applied with a voltage of an opposite polarity to that of the sample.

Figure 6:
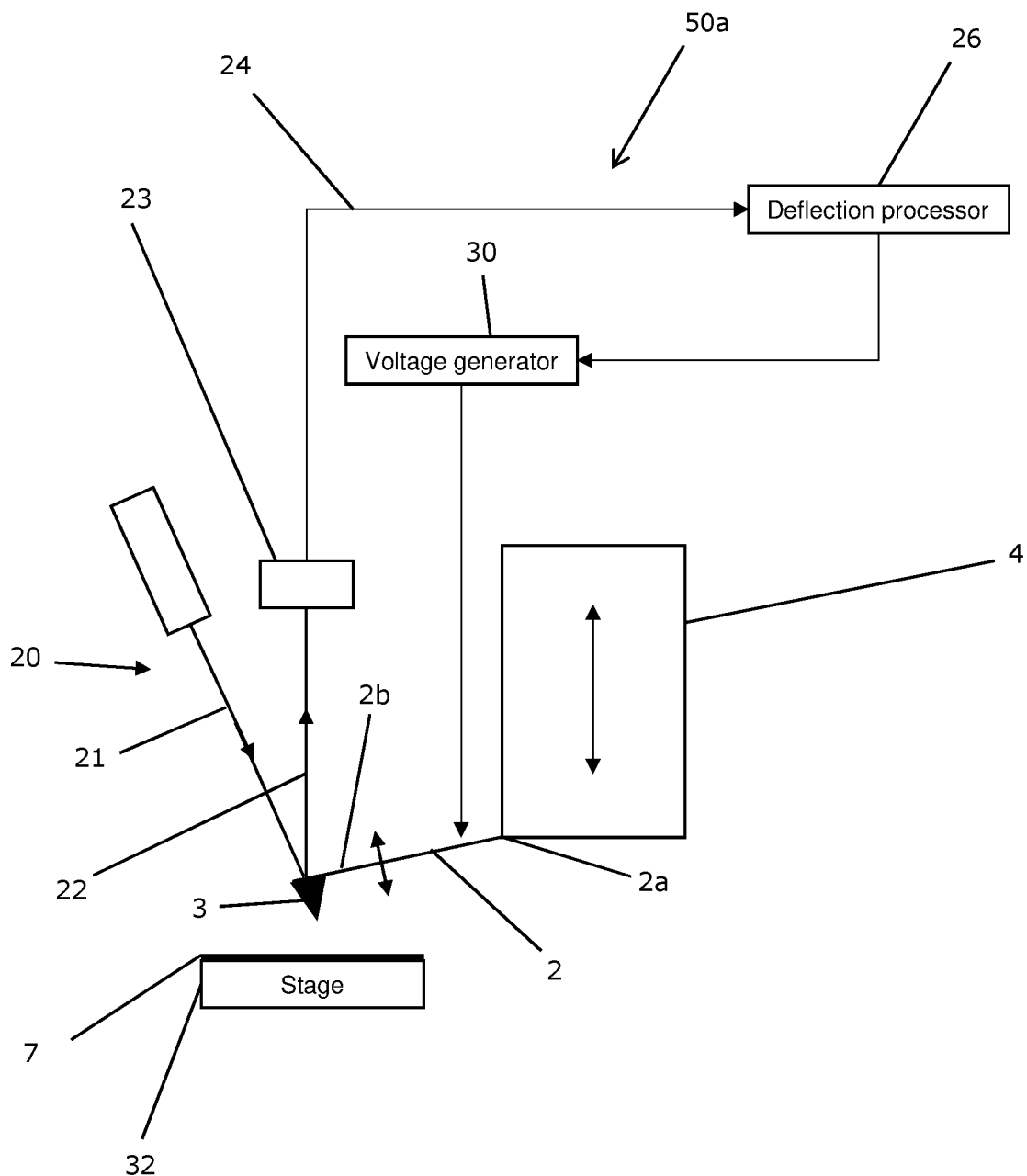
FIG. 6 shows certain elements of a scanning probe system according to another embodiment of the invention.

FIG. 6 shows a scanning probe system 50a which is similar to the system 50 shown in FIG. 1. The same features carry the same reference number and will not be described again. In this case the voltage generator 30 applies a voltage to the cantilever beam 2 rather than the stage 32.

In the case where the probe comprises a gold layer 202 to which a bias voltage is applied by the voltage generator 30, the gold layer 202 should be separated from the probe tip 3 by an electrically insulating barrier. This is because if charge accumulates on the probe tip 3, damage could be caused to the tip or to the sample due to current flowing therebetween. Typical insulators suitable for use as the electrically insulating barrier are silicon, silicon oxide or silicon nitride, and it may therefore be advantageous from a construction perspective to simply apply the gold layer 202 directly to the upper side of the cantilever beam 202, because as mentioned previously the cantilever beam 204 may already be made from said insulating materials. Regardless, it is important that there is no electrically conducting path between the gold layer 202 and the probe tip 3 for the reasons mentioned above.

A bias voltage applied to the stage 32 may completely nullify the electrostatic forces originating from the sample when the probe is at the measurement position (say 5 μm from the sample) but become less effective as the probe tip moves closer to the sample. For this reason it may be preferred to apply the bias voltage to the probe as shown in FIG. 6, since it should remain effective over a wider range of distances.

On the other hand, the arrangement of FIG. 1 may be preferred in other cases if it is difficult to apply a voltage to the probe.

FIGS. 7 to 12 show various different ways of scanning a sample 150 with the scanning probe system described above. The sample is a circular wafer with a 300 m diameter.

In the simplest example, only a single counteracting voltage value is measured, for instance at a measurement position 151 at the centre of the wafer or a measurement position 152 at the edge. In this case, the bias voltage applied to the scanning probe system during scanning of the wafer is based only on this single counteracting voltage value. For instance the bias voltage applied to the scanning probe system during scanning of the wafer may have the same magnitude and sign as this single counteracting voltage value.

Figure 7:
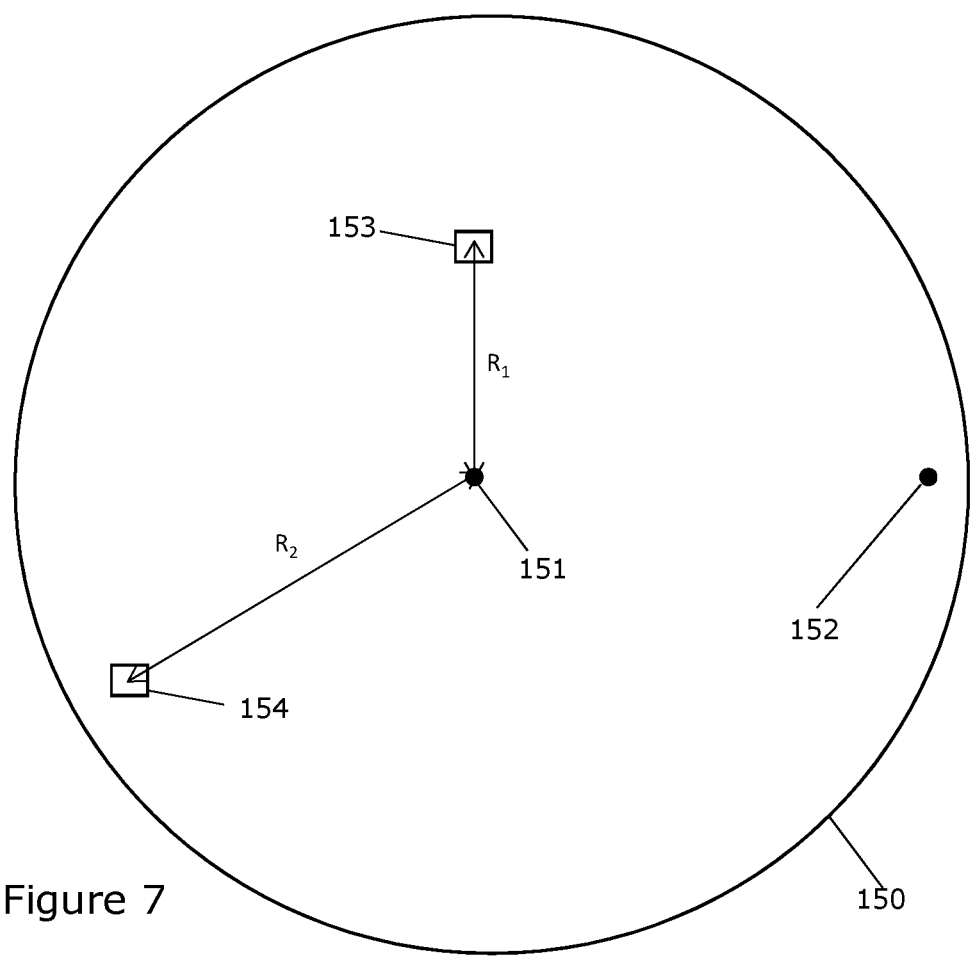
FIG. 7 shows a wafer with two measurement positions.
Figure 8:
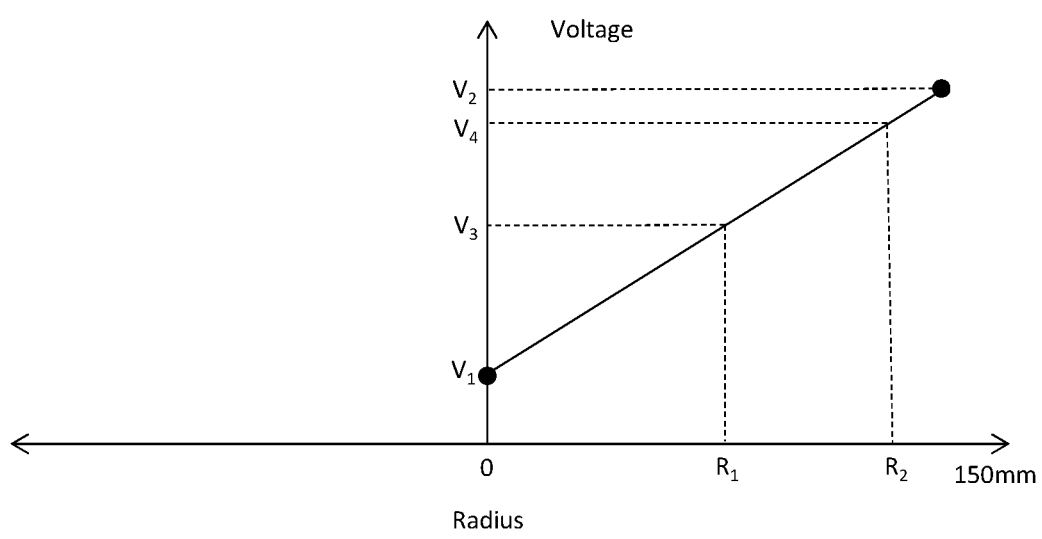
FIG. 8 shows counteracting voltage values for the measurement positions of FIG. 7.

In the example of FIGS. 7 and 8, two counteracting voltage values are measured: one ($V_1$) at the measurement position 151 at the centre of the wafer and the other ($V_2$) at the measurement position 152 at the edge. FIG. 8 illustrates these counteracting voltage values. Note that the voltage is lower at the centre than at the edge.

After the two counteracting voltage values of FIG. 8 have been measured, first and second non-contiguous imaging areas 153, 154 of the sample are scanned.

Before the first imaging area 153 is scanned, a first bias voltage $V_3$ is determined by linear interpolation on the basis of the two counteracting voltage values $V_1$, $V_2$ and the distance $R_1$ of the first imaging area 153 from the centre of the wafer, as shown in FIG. 8. This first bias voltage $V_3$ is applied to the scanning probe system throughout the scanning of the first imaging area 153.

Similarly, before the second imaging area 154 is scanned, a second bias voltage $V_4$ is determined by linear interpolation on the basis of the two counteracting voltage values $V_1$, $V_2$ and the distance $R_2$ of the second imaging area 154 from the centre of the wafer, as shown in FIG. 8. This second bias voltage $V_4$ is applied to the scanning probe system throughout the scanning of the second imaging area 154.

Each imaging area 153, 154 is typically a square with a side of the order of 1-10 μm—thus FIG. 7 is not to scale. Since the size of the imaging area 153, 154 is so small, it is assumed that the voltage of the sample does not vary significantly across the imaging area. Thus the bias voltage does not vary during the scanning of either imaging area 153, 154.

Each imaging area 153, 154 is scanned by taking a series of scanning measurements of the sample at a series of scanning positions across the area 153, 154, each scanning measurement corresponding with a respective pixel. Each scanning measurement is taken by moving the probe tip towards the sample, taking a scanning measurement from the height detector 52 at a respective one of the scanning positions, then retracting the probe tip away from the sample. For each imaging area, 153, 154, the bias voltage applied to the scanning probe system does not vary from scanning position to scanning position. The bias voltage also remains substantially constant as the probe tip moves towards the sample before a scanning measurement, and as the probe tip retracts away from the sample after a scanning measurement.

Figure 9:
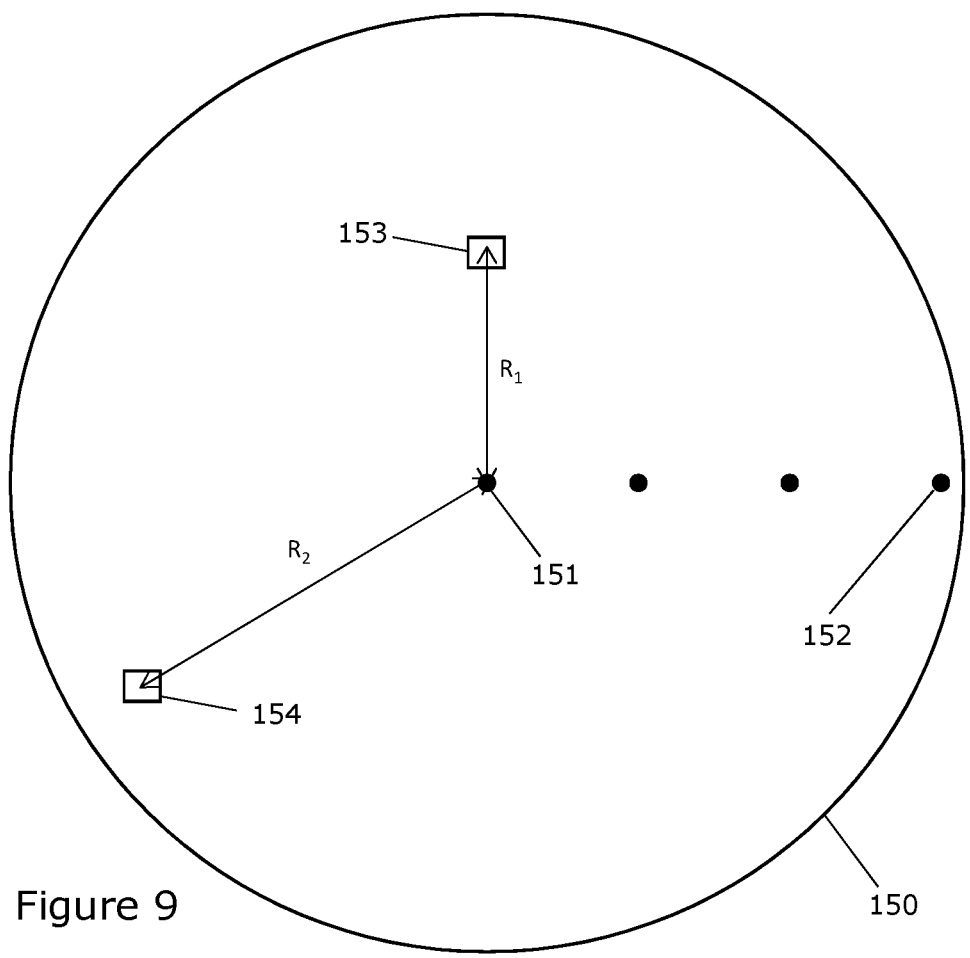
FIG. 9 shows a wafer with four measurement positions.
Figure 10:
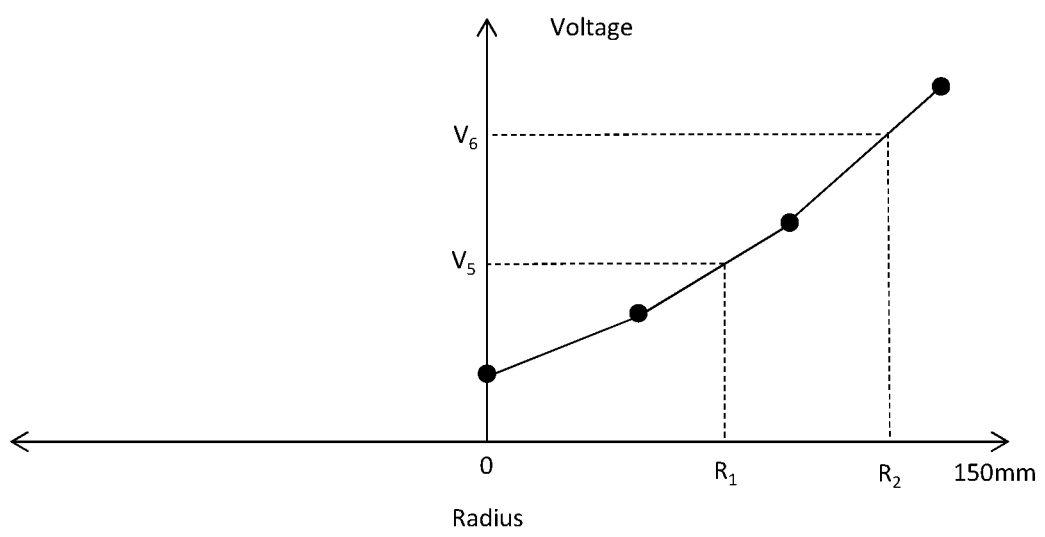
FIG. 10 shows counteracting voltage values for the measurement positions of FIG. 9.

In the example of FIG. 9, four counteracting voltage values are measured: one at the measurement position 151 at the centre of the wafer, one at the measurement position 152 at the edge, and two at intermediate positions. FIG. 10 illustrates these counteracting voltage values: in this case the voltage is lower at the centre than at the edge.

Before the first imaging area 153 is scanned, a first bias voltage $V_5$ is determined by linear interpolation on the basis of the two intermediate counteracting voltage values and the distance $R_1$ of the first imaging area 153 from the centre of the wafer, as shown in FIG. 9. This first bias voltage $V_5$ is then applied to the scanning probe system throughout the scanning of the first imaging area 153.

Similarly, before the second imaging area 154 is scanned, a second bias voltage $V_6$ is determined by linear interpolation on the basis of the two highest counteracting voltage values and the distance $R_2$ of the second imaging area 154 from the centre of the wafer, as shown in FIG. 10. This second bias voltage $V_6$ is applied to the scanning probe system throughout the scanning of the second imaging area 154.

Figure 11:
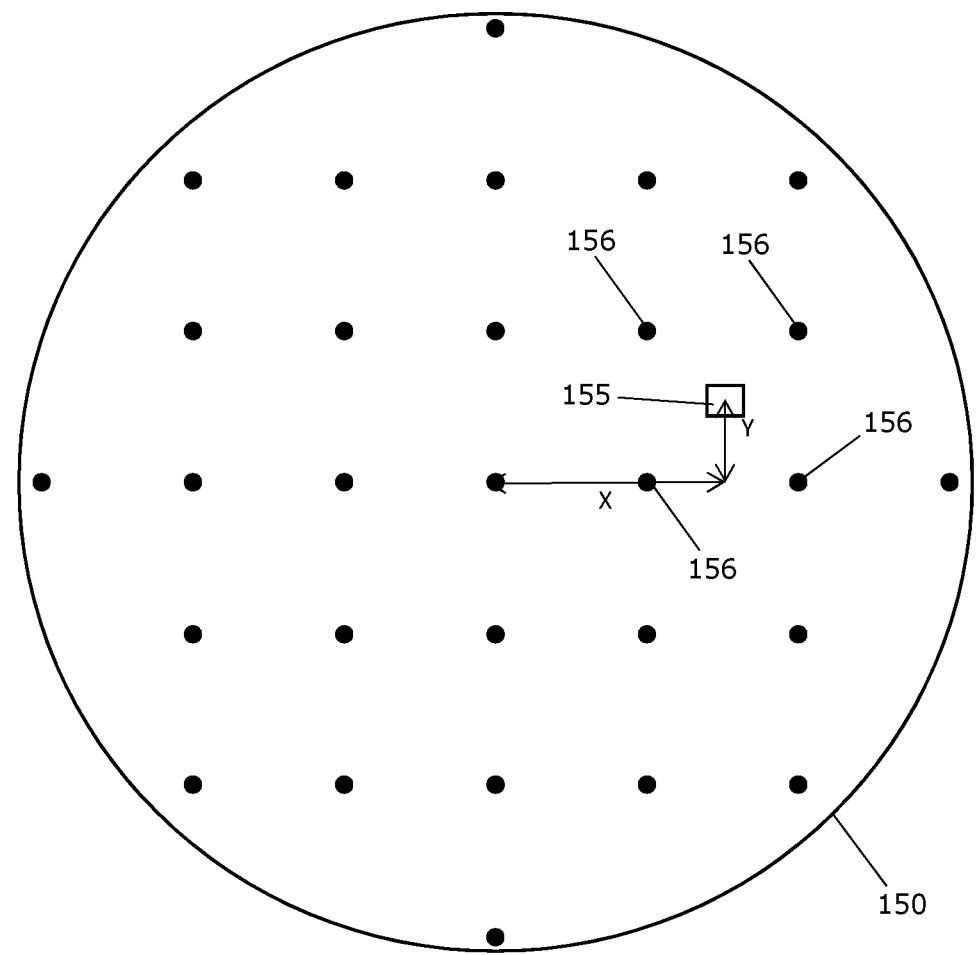
FIG. 11 shows a wafer with a coarse square grid of measurement positions.
Figure 12:
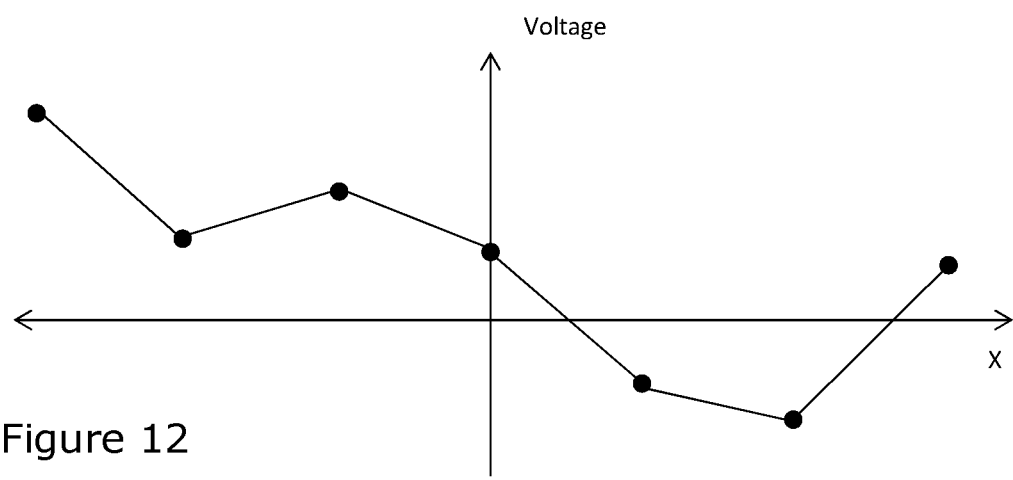
FIG. 12 shows counteracting voltage values for some of the measurement positions of FIG. 11.

The method of FIGS. 9 and 10 assumes that the voltage varies across the sample 150 in a radially symmetric way. FIGS. 11 and 12 show an alternative method in which the voltage varies more non-uniformly across the sample 150.

In the example of FIG. 11, counteracting voltage values are measured throughout the sample 150 on a coarse square grid (approximately 50 mm square). FIG. 12 shows the seven counteracting voltage values measured across the centre of the wafer, which are not radially symmetric.

Before an imaging area 155 with coordinates X and Y is scanned, a bias voltage is determined by linear interpolation on the basis of the X and Y coordinates of the imaging area 155, and on the basis of the counteracting voltage values measured at the four measurement positions 156 in the grid closest to the imaging area 155. This bias voltage is applied to the scanning probe system throughout the scanning of the imaging area 155.

In the examples above, the bias voltage values are calculated by linear interpolation, but other ways of determining the bias voltage from multiple measured counteracting voltage values may be used. For instance: non-linear interpolation, fitting a polynomial curve to the counteracting voltage values, or taking an average of all of the counteracting voltage values.

In the embodiments described above, reference is made to scanning the sample with the probe. By "scanning", it is meant that there is relative lateral movement between the probe and the sample. This may mean that the sample is kept stationary while the probe is moved across the sample's surface, or it may equivalently mean that the probe is held stationary while the sample is moved laterally.

Additionally, although in the aforementioned embodiments the counteracting voltage value is determined before the probe is moved into scanning proximity with the sample (i.e. within nm of the sample), the counteracting voltage value may equivalently be measured and applied only when the probe is in scanning proximity with the sample (i.e. within nm of the sample).

Each of the electronic elements shown in the drawings and described in the text (for instance the deflection processor 26; the voltage generator 30; the amplitude processor, etc.) could be implemented as hardware, software, or anything else, including any combination of hardware and software, for example. By way of example: a single field-programmable gate array (FPGA) or digital signal processor (DSP), or multiple FPGAs or DSPs, could implement all of the electronic elements, or each electronic element could be implemented by a dedicated FPGA or DSP, or any combination of FPGAs or DSPs.

Although the invention has been described above with reference to one or more preferred embodiments, it will be appreciated that various changes or modifications may be made without departing from the scope of the invention as defined in the appended claims.

The invention claimed is:

1. A method of scanning a sample with a scanning probe system, the scanning probe system comprising a probe comprising a cantilever extending from a base to a free end, and a probe tip carried by the free end of the cantilever, the method comprising:
   moving the probe to a measurement position at which the sample imposes an electrostatic force on the probe;
   at the measurement position: applying a measurement voltage to the scanning probe system, varying the measurement voltage applied to the scanning probe system, and monitoring a reaction of the probe to the variation of the measurement voltage to measure a counteracting voltage value which reduces or nullifies the electrostatic force on the probe at the measurement position; and
   after the counteracting voltage value has been measured, scanning the sample with the probe while applying a bias voltage to the scanning probe system, wherein the bias voltage is based on the counteracting voltage value.

2. The method of claim 1, comprising:
   moving the probe to a plurality of measurement positions at which the sample imposes an electrostatic force on the probe; and
   at each measurement position: applying a measurement voltage to the scanning probe system, varying the measurement voltage applied to the scanning probe system, and monitoring a reaction of the probe to the variation of the measurement voltage to measure a respective counteracting voltage value which reduces or nullifies the electrostatic force on the probe at the measurement position; and
   determining the bias voltage on the basis of at least two of the counteracting voltage values.

3. The method of claim 2, wherein an area of the sample is scanned with the probe, and the bias voltage is determined on the basis of a location of the area of the sample.

4. The method of claim 3, wherein the bias voltage does not vary during the scanning of the area of the sample.

5. The method of claim 3, wherein:
   a first bias voltage is determined on the basis of a location of a first area of the sample, and the first bias voltage is applied to the scanning probe system during scanning of the first area of the sample; and
   a second bias voltage is determined on the basis of a location of a second area of the sample, and the second bias voltage is applied to the scanning probe system during scanning of the second area of the sample.

6. The method of claim 1, wherein the counteracting voltage value is determined at the (or each) measurement position with the probe tip spaced from the sample by a distance greater than 1 µm.

7. The method of claim 1, further comprising storing the (or each) counteracting voltage value before the sample is scanned.

8. The method of claim 1, wherein an area of the sample is scanned with the probe, and the bias voltage applied to the scanning probe system does not vary during the scanning of the area of the sample.

9. The method of claim 1, wherein scanning the sample with the probe comprises taking a series of scanning measurements of the sample at a series of scanning positions across the sample; and wherein each scanning measurement is taken by moving the probe tip towards the sample, taking a scanning measurement at a respective one of the scanning positions, then retracting the probe tip away from the sample.

10. The method of claim 9, wherein the bias voltage applied to the scanning probe system does not vary from scanning position to scanning position.

11. The method of claim 9, wherein for each scanning measurement the bias voltage applied to the scanning probe system remains substantially constant as the probe tip moves towards the sample, and as the probe tip retracts away from the sample.

12. The method of claim 1, wherein the variation of the measurement voltage causes the probe to deflect, and the deflection of the probe is monitored to determine the counteracting voltage.

13. The method of claim 1, wherein the variation of the measurement voltage causes an oscillation parameter of the probe to change, and the oscillation parameter is monitored to determine the counteracting voltage.

14. The method of claim 1, wherein the measurement voltage and the bias voltage are applied to the probe.

15. The method of claim 1, wherein the measurement voltage and the bias voltage are applied to a conductor proximate to the sample.

16. The method of claim 1, wherein scanning the sample with the probe comprises imaging the sample with the probe so as to generate an image having a plurality of pixels.

17. The method of claim 16, wherein the bias voltage applied to the scanning probe system is the same for each pixel of the image.

18. A scanning probe system comprising: a probe comprising a cantilever extending from a base to a free end, and a probe tip carried by the free end of the cantilever; wherein the scanning probe system is arranged to perform the method of claim 1.

19. The scanning probe system of claim 18, wherein the scanning probe system is arranged to apply the bias voltage to the probe.

20. The scanning probe system of claim 19, wherein the cantilever comprises an electrically conductive layer separated from the tip by an electrically insulating barrier, and the scanning probe system is arranged to apply the bias voltage to the electrically conductive layer.

* * * * *